(12) United States Patent
Andreasi et al.

(10) Patent No.: US 12,168,576 B2
(45) Date of Patent: Dec. 17, 2024

(54) AUTOMATED SYSTEM FOR HANDLING, IN PARTICULAR FOR OVERTURNING, CONTAINERS SUCH AS TRAYS OF CAGES FOR HOUSING LABORATORY ANIMALS

(71) Applicant: IWT S.R.L., Casale Litta (IT)

(72) Inventors: Matteo Andreasi, Ispra (IT); Michele Vitali, Angera (IT); Marco Pagani, Legnano (IT)

(73) Assignee: IWT S.R.L., Casale Litta (IT)

( * ) Notice: Subject to any disclaimer, the term of this patent is extended or adjusted under 35 U.S.C. 154(b) by 92 days.

(21) Appl. No.: 18/097,865

(22) Filed: Jan. 17, 2023

(65) Prior Publication Data
US 2023/0227270 A1 Jul. 20, 2023

(51) Int. Cl.
*B65G 47/252* (2006.01)
*A01K 1/035* (2006.01)
*B65G 41/00* (2006.01)
*B65G 47/82* (2006.01)

(52) U.S. Cl.
CPC ............ *B65G 47/252* (2013.01); *A01K 1/035* (2013.01); *B65G 41/002* (2013.01); *B65G 47/82* (2013.01)

(58) Field of Classification Search
CPC .... B65G 47/252; B65G 41/002; B65G 47/82; A01K 1/035
USPC ....................................... 198/403, 404, 408
See application file for complete search history.

(56) References Cited

U.S. PATENT DOCUMENTS

| | | | | |
|---|---|---|---|---|
| 2,909,876 | A | * 10/1959 | McGihon | ................... B65B 5/06 53/543 |
| 4,344,727 | A | * 8/1982 | Chaloupka | ............. B65H 31/38 414/758 |
| 4,907,686 | A | * 3/1990 | Cotic | ................... B65G 47/252 198/409 |
| 5,484,251 | A | 1/1996 | Sanda | |
| 6,098,762 | A | 8/2000 | Hardage et al. | |
| 6,098,783 | A | 8/2000 | Erlandson et al. | |

(Continued)

FOREIGN PATENT DOCUMENTS

| CN | 105800291 A | 7/2016 |
|---|---|---|
| DE | 3134573 A1 | 1/1981 |

(Continued)

*Primary Examiner* — James R Bidwell
(74) *Attorney, Agent, or Firm* — Troutman Pepper Hamilton Sanders LLP

(57) ABSTRACT

Automated system for handling, in particular for overturning, containers such as cage trays for housing laboratory animals. The automated system being suitable to be positioned at the outlet module of a station for treating or washing, the containers and possibly other component parts of the cages such as the lid, the trough and similar component parts. The system then receives the containers and/or other component parts at the outlet from the treatment station, in particular washing station. The system can comprise a first conveyor belt capable of interfacing the outlet module so as to receive the containers and/or the component parts at the outlet of the treatment station. A second conveyor belt can be arranged in succession so as to define a transport direction of the containers and/or component parts substantially parallel to the feed direction of the containers and/or component parts at the exit from the treatment station.

14 Claims, 5 Drawing Sheets

(56) References Cited

U.S. PATENT DOCUMENTS 7,607,862 B2 * 10/2009 Thorsbakken ........ F03B 17/061
 60/497
2007/0284220 A1 12/2007 Riddick et al.
2016/0362258 A1 12/2016 Anders et al.

FOREIGN PATENT DOCUMENTS

| EP | 0101025 A2 * | 8/1982 | ............. B65G 47/24 |
|----|--------------|--------|--------------------------|
| EP | 0233657 B1 | 1/1987 | |
| EP | 848098 A2 | 6/1998 | |
| EP | 2263943 A1 * | 12/2010 | ............. B65B 69/00 |
| EP | 2301866 A1 | 3/2011 | |
| JP | 2001301953 A | 10/2001 | |
| JP | 5085981 B2 | 11/2012 | |

* cited by examiner

AUTOMATED SYSTEM FOR HANDLING, IN PARTICULAR FOR OVERTURNING, CONTAINERS SUCH AS TRAYS OF CAGES FOR HOUSING LABORATORY ANIMALS

CROSS-REFERENCE TO RELATED APPLICATIONS

This application claims priority to the Italian Patent Application No. 102022000000896 of 20 Jan. 2022, which is incorporated by reference in its entirety.

FIELD OF INVENTION

The present invention relates to the field of moving and manipulating containers, in particular trays of cages for housing laboratory animals. In particular, the present invention relates to an automated system for handling, in particular for overturning, containers of the aforementioned type, in particular but not exclusively containers for animals used in enclosures for pharmaceutical research.

More precisely, the containers for animals in question are constituted by trays in plastic material shaped like a tray and suitable for containing, on a litter or bedding consisting of a suitable material, one or more laboratory animals such as small rodents, guinea pigs or similar, wherein each of said trays forms part of a cage possibly including further component parts such as the lid, the feed trough and similar parts.

BACKGROUND

It is well known that scientific experimentation carried out on laboratory animals requires that the environmental conditions of the enclosure are constantly controlled in order to ensure optimal health conditions and a high-quality standard of the living conditions of the animals. It is therefore clear from this point of view that the hygienic conditions of the housing trays for animals constitute an extremely important aspect not only for the living conditions of the animals but for the good quality of the scientific research itself.

The containment devices or trays (hereinafter the containers) of the laboratory animals are therefore periodically removed from the shelves, emptied of the animals contained therein and of the material constituting the litter or bedding, and carefully washed. Since washing must be extremely accurate and since the number of trays can be very high depending on the size of the animal enclosure, automatic tray washing systems have been developed and are now widely used, which systems offer the double advantage of optimizing the time required for washing and carrying out a very thorough cleaning of the trays.

In particular, since the part which needs to be washed more thoroughly is the tray, washing systems specifically designed to process trays are known. In particular, known washing stations are shaped like tunnels and comprise several modules arranged in succession along a predefined direction, wherein the use of said washing stations provides that the trays are placed, manually by the operator or by means of robotic systems, on a conveyor belt that carries the trays through different modules in which they are subjected to washing, rinsing, drying and sanitization, before being filled again with clean bedding and made available again for the animal enclosure. Before being placed on the belt of the washing tunnel, the trays are emptied of their contents by turning them upside down, and are positioned upside down on the conveyor belt, so that the tray cavity faces downwards. In this way it is avoided that during washing operations, when the trays are hit by jets of water, the liquid can accumulate inside the tray so as to cause various inconveniences. First of all, the risk of blocking the plant due to a decrease in the level of the liquid in the washing tanks but also the reduction of the washing effect, as well as a useless accumulation of water which would therefore be subtracted from the washing plant, of course in addition to the need to empty one by one the trays leaving the washing tunnel.

Also in the known systems, at the end of the washing tunnel an operator is expected to take the trays from the conveyor belt, turn them over, and fill them again with clean material constituting the litter or bedding. Generally, the trays are filled by using a device called a dispenser, whereby the operator has to take care of overturning the trays and positioning them correctly under the dispenser. Furthermore, in order to speed up and optimize the washing operations, normally the known washing tunnels described herein provide that several trays can be placed on the conveyor belt at the same time, so that at the clean-side exit of the washing tunnel the operator has to manage (turn over and position) a plurality of trays which are pushed by the conveyor belt towards the station filling the clean bedding. Also in this case, in order to speed up the operations, dispensers capable of filling several trays at the same time are normally used, said dispensers being equipped with a plurality of nozzles arranged side by side for dispensing the bedding. The operator must therefore take care, once the trays have been overturned, to align them side by side to form a row generally of three or four trays side by side which are thus placed below the dispenser and eventually filled simultaneously.

Known washing stations are usually employed, in order to further optimize and automate the washing process, in combination with devices suitable for automatically overturning the trays leaving the washing tunnel, without requiring the intervention of the operator.

However, known solutions for overturning the trays have numerous drawbacks which the applicant has overcome by means of the solution according to the present invention.

A first drawback or defect relates to the fact that the overturning devices of the known type are not very reliable (subject to breakdowns or downtimes) and are not very flexible (they are only suitable to process a few types of substantially similar trays).

A solution known from the state of the art and widespread to obtain the overturning of the trays leaving the washing tunnel and their correct positioning under the dispenser, provides for the use of a roller table positioned at a lower height than the conveyor belt of the washing tunnel so that the trays leaving the tunnel fall by gravity onto the roller table, normally tipping over. Of course, this method has numerous drawbacks, first of all the fact that it is ineffective for a certain percentage of trays which, falling by gravity, do not tip over correctly, for example resting on their side. Moreover, a further drawback is given, for example, by the fact that, in order to obtain the overturning of the trays, a certain difference in height is necessary between the conveyor belt and the roller surface or table, wherein the trays thus impact with a certain force, often excessive, the table at the end of their fall, with the obvious risk of damaging the trays.

The main drawback of this solution however remains the randomness of the overturning operation, so that the operator often has to intervene to straighten and order the trays on the roller table. Furthermore, the height difference between the conveyor belt and the receiving roller table is generally fixed, and therefore the percentage of success in overturning varies as the type of trays varies. A further drawback of this known system consists of the lack of ergonomics for the operator: the roller table, being at a lower height than the conveyor belt, in fact forces the operator called to pick up the trays to assume a very uncomfortable and unnatural position.

Another known system, currently used to overturn the trays exiting the washing tunnel and to correct their positioning at the nozzles of the bedding dispenser, has a higher degree of automation and provides for ordering the trays at the exit of the washing tunnel by aligning them, by means of a special alignment device, side by side to form rows of three or more trays placed side by side in a transversal direction to the feed direction of the conveyor belt, transport them up to a overturning device with a clamp which grabs them and flips them by 180°. However, this system is not very versatile since the conveyor system at the exit of the washing tunnel tolerates only modest dimensional variations of the trays, providing that special gripping teeth are inserted into the trays to push them in the feed direction, wherein moreover the overturning system cannot be associated with existing washing tunnels without requiring substantial structural modifications. Furthermore, the overturning system as a whole is very cumbersome.

A further solution of the known type for overturning the trays is shown in FIG. 1 and described and claimed in patent IT 1395922 owned by the applicant.

In FIG. 1, references 10, 20 and 30 respectively indicate an overturning device, a dispenser of bedding material and the outlet module of a washing station (represented only partially).

Still as shown, the trays V exit the washing station with the cavity facing downwards and are advanced along the direction A by means of rotating rollers 70 until they enter an overturning cage 40 in which they are stopped by a front bar transversal, wherein the trays V are then blocked by means of a gripper system, with the lowering of the upper bars 60 and the raising of the lower bars 50 of cage 40.

The overturning of the trays V therefore provides for the cage 40 to be raised, subsequently rotated by 180°, then lowered until the trays V are arranged again on the rollers 70, wherein the bars 50 and 60 of the cage 40 are eventually opened, freeing the trays V which are then advanced again until they reach the dispenser 20.

With regard to further details of the device of FIG. 1, in particular to the relevant means for aligning and compacting the trays V, reference is made to patent IT 1395922.

Document JP 5085981 B2 discloses a system for overturning wooden blocks, which comprises first and second transport means formed by roller tables, so that this known system has substantially the same problems as the system of document IT 1395922.

The specific aim of the present invention is therefore to provide an automated system for overturning the trays leaving a washing tunnel and for positioning them correctly at the subsequent station for filling the trays with new clean bedding which allows to overcome at least in part the problems described above and left unsolved by the known systems.

Within the scope of this aim, an object of the present invention is to provide a device suitable for being installed in small spaces and for being combined with any tunnel-type washing machine.

Not least object of the present invention is to provide a device capable of processing trays having different shapes and/or dimensions without the need for adaptations, so as to be more versatile than the known systems.

Further, object of the present invention is to provide a device for overturning and positioning the trays at the dispensing device, which device is capable of automatically orienting each tray parallel to the feed direction of the conveyor belt and of arranging several trays parallel in rows transversal to the feed direction in order to optimize the positioning of the trays in the filling phase by means of the dispenser.

A further object of the present invention is to provide an automated system or device which, in the event of breakdowns or maintenance needs, can be easily stopped by creating, in a simple and rapid way, the space for the operator for manually carrying out the unloading operations of the tunnel line.

Further objects of the present invention comprise: the possibility of processing a very wide variety of trays and in any case higher than the variety which can be processed with current solutions; the possibility of processing different objects in addition to the trays, such as for example the lids and the troughs of the relevant cages; allow the transit of the trays from the exit of the washing station to the operator's station located downstream of the bedding dispensing module without interrupting the workflow; the possibility of automatic adaptation to the washing mode of the baskets containing the bottles for watering the animals by interrupting the physical continuity of the line immediately after leaving the washing station without mechanical interventions; the possibility of using a simple and reliable cage alignment system; and containing production costs.

SUMMARY

According to the present invention the set objects are at least partially achieved and the drawbacks of the known state of the art at least partially overcome by means of an automated system and a station according to the independent claims, as well as by means of the embodiments of said system and said station, respectively, according to the dependent claims.

According to one embodiment, an automated system is proposed for handling, in particular for overturning, containers such as cage trays for housing laboratory animals, said automated system being suitable to be positioned at the outlet module of a station for treating, in particular for washing, said containers and possibly other component parts of said cages such as the lid, the feed trough and similar component parts, so as to receive said containers and/or other component parts at the outlet from said station for treatment, in particular washing, wherein said automated system comprises a first conveyor belt capable of receiving said containers and/or said component parts coming out from said treatment station, in particular washing station, and a second conveyor belt arranged in succession so as to define a transport direction of said containers and/or component parts substantially parallel to the feed direction of said containers and/or component parts at the outlet of said treatment station, in particular washing, wherein said first conveyor belt and second conveyor belt define a first transport surface and a second transport surface, respectively, which are substantially parallel, wherein said first conveyor belt can rotate between a first position and a second position about an axis of rotation substantially transversal to said transport direction, wherein said first conveyor belt is equipped with first stop means suitable to stop said containers in a predefined position on said first conveyor belt, and wherein, with said containers stopped in said predefined position by said first stop means, the rotation of said first conveyor belt from said first position to said second position results in the fall of said containers onto the second transport surface of said second conveyor belt in a position overturned by 180° with respect to the position on said first transport surface of said first conveyor belt.

According to an embodiment, said axis of rotation of said first conveyor belt is positioned in proximity to the end portion of said second conveyor belt adjacent to said first conveyor belt.

According to an embodiment, in said second position, said first transport surface of said first conveyor belt is rotated with respect to said first position by an angle greater than 90° so that the projection of said first conveyor belt in a vertical direction with respect to said second transport surface of said second conveyor belt at least partially overlaps said second conveyor belt.

According to an embodiment, said first stop means comprise a stop bar substantially parallel to said axis of rotation of said first conveyor belt.

According to an embodiment, said stop bar can be translated along a direction substantially perpendicular to the transport surface of said first conveyor belt, and therefore the distance of said stop bar from said transport surface of said first conveyor belt is adjustable according to the dimensions of said containers and/or said other component parts.

According to one embodiment, said system comprises a cylindrical brush suitable to be positioned at the outlet of said treatment station, in particular washing station, wherein said cylindrical brush can rotate around an axis of rotation substantially perpendicular to said feed and transport directions, wherein therefore the rotation of said cylindrical brush facilitates the repositioning of said containers and/or other component parts from said outlet module of said treatment station, in particular washing station, on said first transport surface of said first conveyor belt.

According to an embodiment, said system comprises means for compacting and aligning said containers on said second conveyor belt suitable for aligning a plurality of containers along a direction substantially perpendicular to said transport direction.

According to an embodiment, said compacting and aligning means comprise second stop means suitable for stopping said containers in a predefined position on said second conveyor belt, wherein in said predefined position at least two containers are arranged one adjacent to the other along a direction substantially perpendicular to their transport direction on said second conveyor belt, and wherein said compacting and aligning means comprise means adapted to put said at least two containers in reciprocal contact.

According to an embodiment, said alignment means comprise thrust means suitable for exerting a thrust on one of at least two containers along a direction perpendicular to said transport direction so as to put it in contact with said at least one second container.

According to one embodiment, a station is proposed for arranging litter or bedding material inside cage trays for housing laboratory animals, wherein said station comprises a dispenser for said bedding material, and wherein said station comprises an automated system according to one of the above-mentioned embodiments.

According to an embodiment, said dispenser comprises a plurality of nozzles each adapted to introduce a portion of said bedding material into a respective tray of a respective plurality of trays aligned and compacted by compacting and aligning means of said automated system.

DESCRIPTION OF THE FIGURES

The present invention will be further disclosed by means of the following detailed description of the embodiments represented in the drawings, wherein in the drawings.

DETAILED DESCRIPTION

Figure 1:
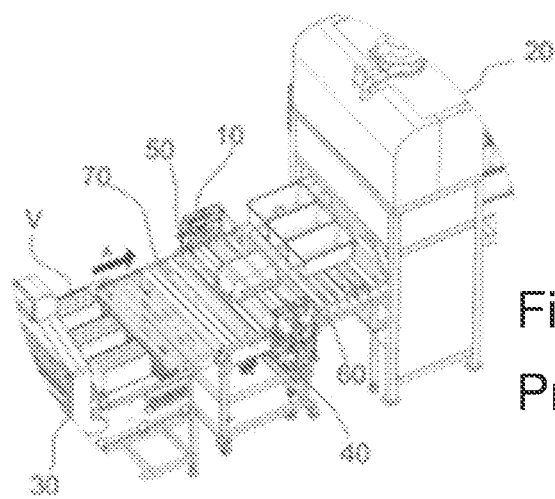
FIG. 1 is a perspective view of an automated overturning device according to the prior art.
Figure 2:
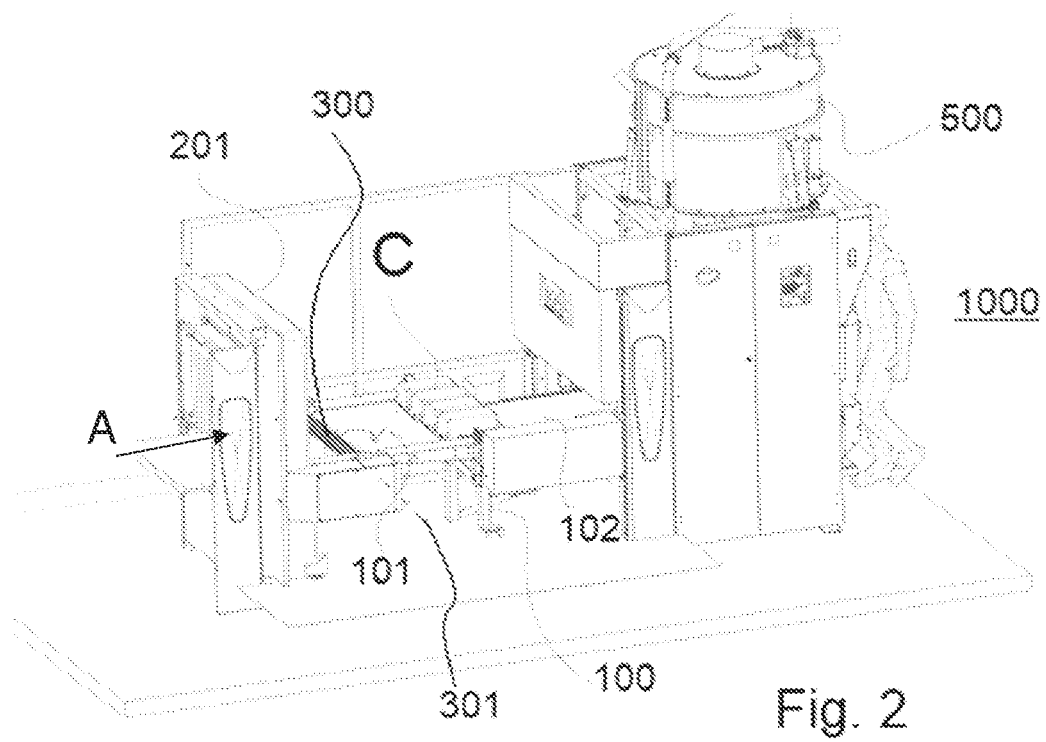
FIG. 2 is a perspective view of a station including an automated overturning system according to an embodiment.
Figure 3A:
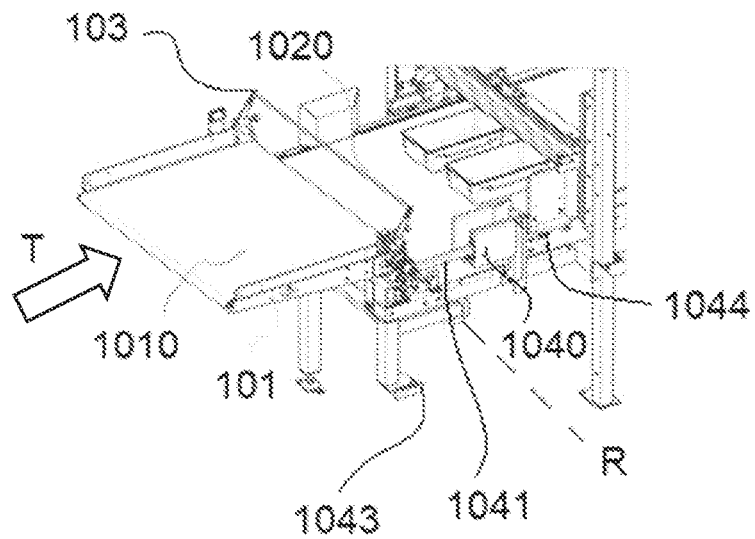
FIGS. 3a and 3b are perspective views of an overturning system according to an embodiment in different phases of the overturning.

In FIGS. 2 to 3 the automated overturning system is identified by the reference 100 and is arranged between the outlet module 201 of a washing station for containers (represented only in part), in particular for trays of cages for laboratory animals enclosures, and a dispenser 500 (not the subject of the following invention) for bedding material, wherein the system 100 and the dispenser 500 can be considered as a unit suitable for overturning the containers C coming out of the module 201 and for dispensing inside them a predefined amount of bedding material.

Figure 4A:
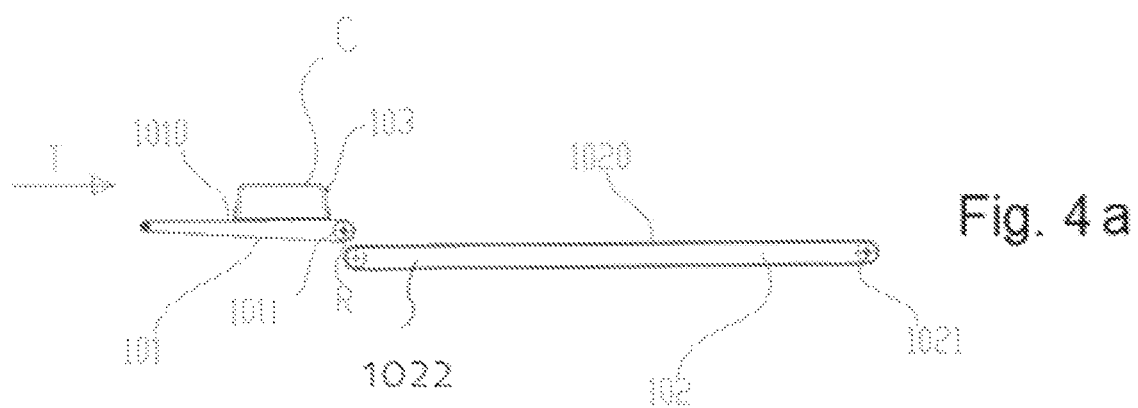
FIGS. 4a and 4b are a schematic form of the overturning system of FIGS. 3a and 3b in different phases of the overturning.

Still as shown, the system 100 comprises a first conveyor belt 101 and a second conveyor belt 102 which define a first transport surface 1010 and a second transport surface 1020, respectively, the surfaces 1010 and 1020 being placed on different planes, in particular the second surface 1020 being positioned lower than the first surface 1010, the first conveyor belt 101 and the second conveyor belt 102 being capable of advancing the containers C exiting the module 201 along a transport direction T substantially parallel to the direction A along which the containers C exit the module 201. For this purpose, each of said first conveyor belt 101 and second conveyor belt 102 is controlled by a respective motorized roller, the first conveyor belt 101 being in particular controlled by a first motorized roller 1011 (FIG. 4A and FIG. 4B), the second by a motorized roller 1021.

However, it should be noted that, according to the present invention, it is possible to envisage the use of means of transport equivalent to said first conveyor belt 101 and second conveyor belt 102. For example, it is possible to use transport means by which the feed of the containers C along the direction T is obtained by vibration.

Figure 3B:
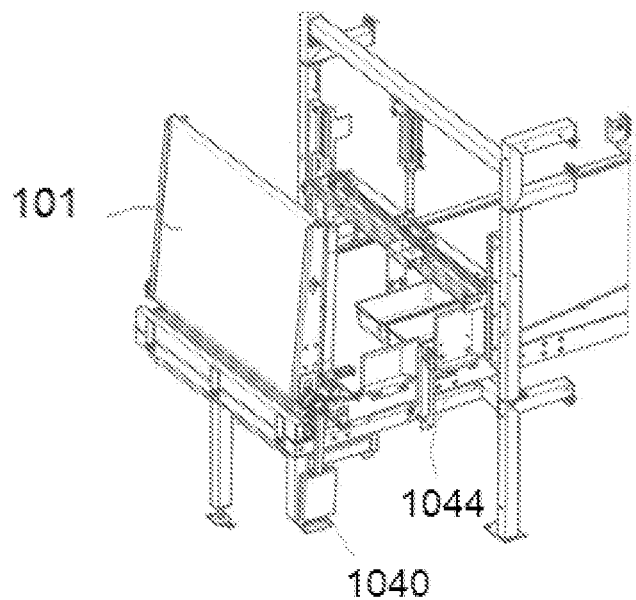
Figure 4B:
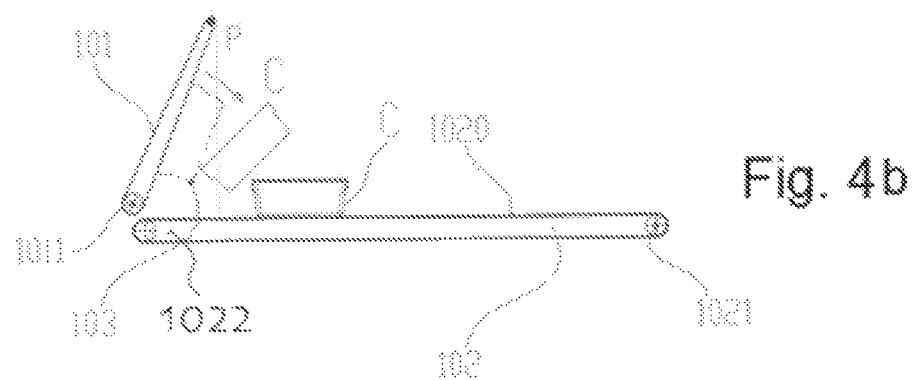

Again, as shown (FIGS. 3 and 4), the first conveyor belt 101 (or equivalent conveying and/or feed means) is switchable by rotation with respect to a fixed axis of rotation R and positioned in proximity to the end portion 1022 of said second conveyor belt 102 adjacent to said first conveyor belt 101, wherein the rotation axis R coincides with the rotation axis of the first motorized roller 1011, the rotation of the first conveyor belt 101 being obtained by means of a gearmotor (not shown) at variable speed, higher at the beginning of the rotation (from the position of FIGS. 3a and 4a), lower at the second position of FIGS. 3b and 4b. Alternatively, it is possible to provide a first conveyor belt (or equivalent transport or feed means) which can be switched by rototranslation, namely by rotation around an axis of rotation R which can be translated in this case.

The angle of rotation (clockwise with respect to the figures) of the first conveyor belt 101 from the first end position (FIGS. 3*a* and 4*a*) to the second end position (FIGS. 3*b* and 4*b*) depends on the inclination of the belt 101 in the said first end position, in particular of the surface 1010 with respect to a horizontal reference plane and can be for example greater than 90° (in the case of a horizontal surface 1010), wherein therefore, in the second end position the projection P of the first conveyor belt 101 (see dashed line) perpendicularly to the surface 1020 of the second conveyor belt 102 falls at least partially onto the second conveyor belt 102, the angle of rotation being adjustable according to the geometry of the center of gravity of the containers C.

In the figures, the reference 103 identifies a stopper, in particular a bar arranged transversely to the transport direction T, the height of which with respect to the surface 1010 is adjustable by means suitable for the purpose, for example pneumatic and/or hydraulic and/or mechanical or the like, wherein for the overturning of the containers C the bar 103 is positioned at a height from the surface 1010 lower than the height of the containers C so as to intercept and stop the containers C during their feed along the direction T, leaving on the contrary free the other lower components, for example component parts of cages such as their lids, troughs and similar components.

It should also be considered that although in the embodiment shown in the figures said first transport surface 1010 and second transport surface 1020 are substantially parallel and horizontal, embodiments are possible in which, for example, in order to minimize the impact of the containers C on the surface 1020, said first surface 1010 and second surface 1020 can be inclined with respect to a horizontal reference plane, for example with the first surface 1010 inclined downwards towards the stopper 103, and the second surface 1020 also inclined towards the stopper 103, precisely for the purpose of reducing the impact force during the overturning of the container C.

If the surface 1010 performs a large rotation, for example by 120°, the stopper 103 can swing freely so as not to impact or interfere with the surface 1020.

The methods of overturning the containers C by means of the system shown in the figures can be summarized as follows.

With the first conveyor belt in the first position (substantially horizontal) and arranged to interface the module 201, the containers C leaving the module 201 (arranged with the cavity facing downwards), are received by the first conveyor belt 101 and fed along the direction T.

When the containers C reach the stop bar 103, a first sensor (not shown) detects their position and starts the rotation of the first belt 101 from the first position towards the second position.

The rotation of the first belt 101 from the first end position is facilitated by a counterweight 1040 comprising an arm 1041 of which a first end is integral with the frame of the first belt 101 while the second end of the arm 1041 opposite to said first end carries a weight 1042. The arm 1041 is then cantilevered fixed to the bearing shoulder of the first belt 101, whereas with the first belt 101 in the first end position the counterweight 1040 is positioned laterally with respect to the second belt 102 (according to a top view), with the arm 1041 lying on a surface parallel to said first surface 1010 (of the first belt 101) and second surface 1020 (of the second belt 102). The counterweight 1040 also cooperates with a second position sensor 1043 and a third position sensor 1044, wherein the second position sensor 1043, during the rotation of the first belt 101 from the first position to the second position, detects the counterweight 1040 upon reaching the second position by the first belt 101 causing the first belt 101 to stop in said second position, while the third position sensor 1044, during the rotation of the first belt 101 from the second position to the first position, detects the counterweight 1040 upon reaching the first position by the first belt 101 causing the first belt 101 to stop in said first position.

With the belt 101 in a substantially vertical position, the stop bar 103, which in the meantime has rotated together with the first belt 101, is positioned above the surface (conveyor plane) 1020 of the second conveyor belt 102, wherein the containers C, no longer held, are overturned by the effect of gravity on the second conveyor belt 102 without any impediment and are then repositioned on the surface 1020 of the second belt 102 with the cavity facing upwards.

Furthermore, when the first belt 101 arrives in a substantially vertical position, the second sensor 1043 detects this position and stops the transport function of the belt 101 itself, where the transport function of the belt 101 is reactivated (by reactivating the rotation of the roller 1011) with the return of belt 101 to the first position. The containers C which in the meantime have fallen onto the second belt 102 are overturned by 180° (correct position for receiving the bedding) with respect to the position they had both at the exit from the module 201 and on the first conveyor belt 101.

Differently from the sequence of operations just described, if different components are loaded onto the first conveyor belt 101, such as for example lids and/or troughs of cages for animal enclosures, these components, due to their reduced height, are not intercepted by said first sensor (fixed laterally on the supporting shoulder of the conveyor belt 101, at a suitable and adjustable height, and placed immediately before the stop bar 103 with respect to the transport direction T), wherein therefore the rotation of the conveyor belt 101 from the first position is not enabled in the second position, and wherein therefore said components of reduced height can transit without being intercepted up to the end of the line.

In order to make the passage of the containers C from the belt of the module 201 to the first conveyor belt 101 flexible and reliable, the overturning system can be combined with a cylindrical brush 300, for example with bristles in synthetic material, arranged at the outlet of the belt of the module 201, the brush 300 being adapted to be rotated (around an axis transverse to the directions A and T and clockwise with respect to the figures, see the arrow in FIG. 3), by means of an independently controlled gearmotor. The peripheral speed of the brush 300 is considerably higher than the speed of the belt of the module 201, the brush 300 essentially having the fundamental function of "accompanying", by rotating, containers C and/or components such as lids and troughs, in the passage from the belt of the module 201 to the first conveyor belt 101, wherein in the absence of the brush 300 the risk of jamming of the cages, lids and troughs would be very high with consequent risks of mechanical breakage and machine downtime.

In a continuous industrialized plant, the motor-brush 300 can be coupled (fixed) to the first conveyor belt 101 of the system 100 or alternatively to the output module 201 according to simple and substantially known methods and therefore not described in detail.

In order to each receive a dose of bedding material by means of a dispenser with a plurality of nozzles, the containers C, once overturned according to the previously described ways, must be compacted on one side of the second conveyor belt 102 to ensure that each comes to be under a respective dispensing nozzle of the bedding material.

Figure 5A:
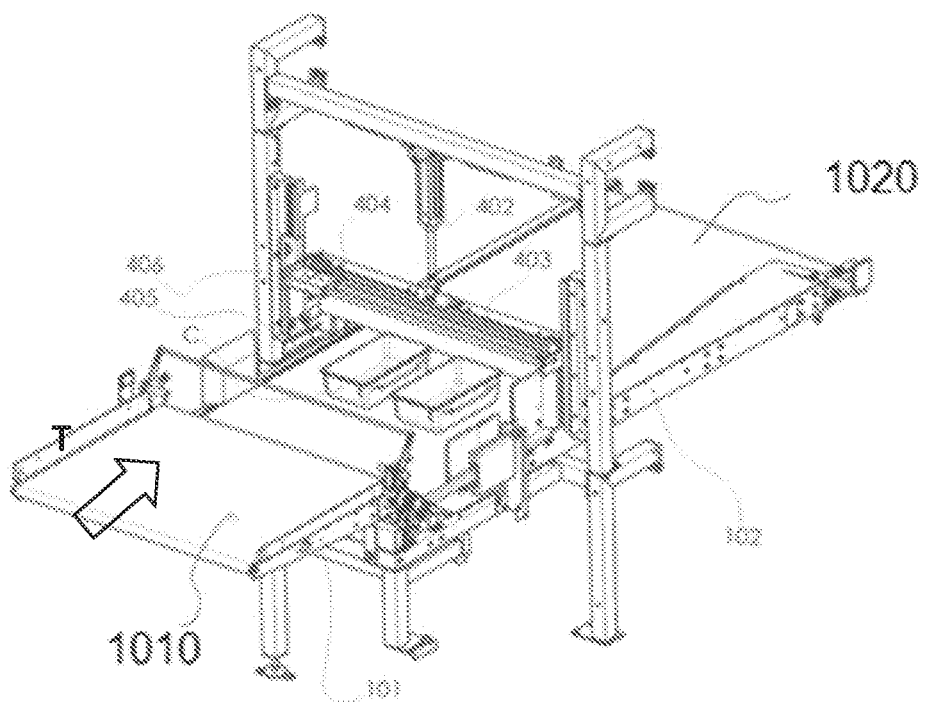
FIGS. 5a and 5b are perspective views of the overturning system combined with an alignment and/or compacting device.
Figure 5B:
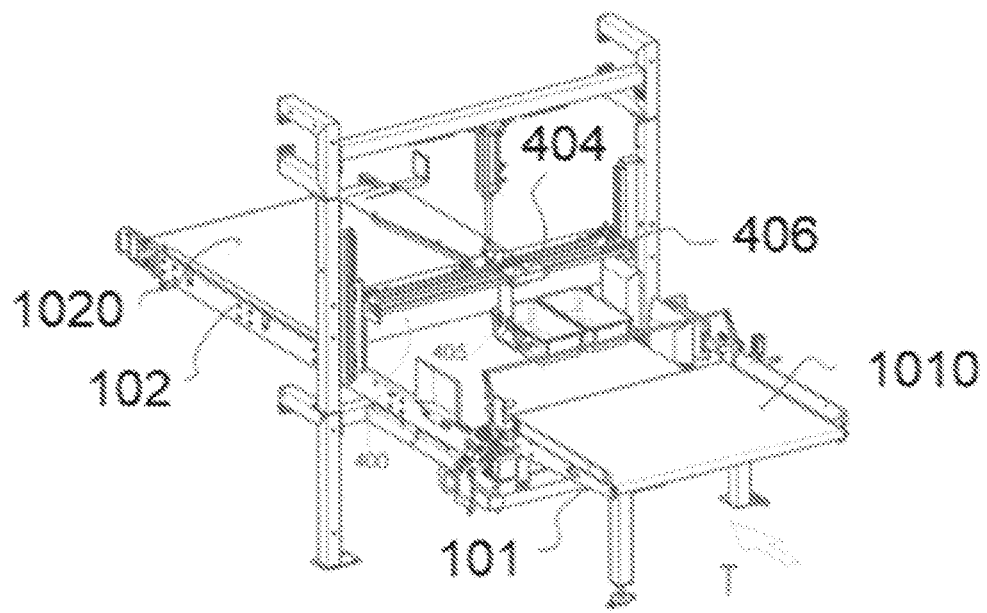
Figure 6A:
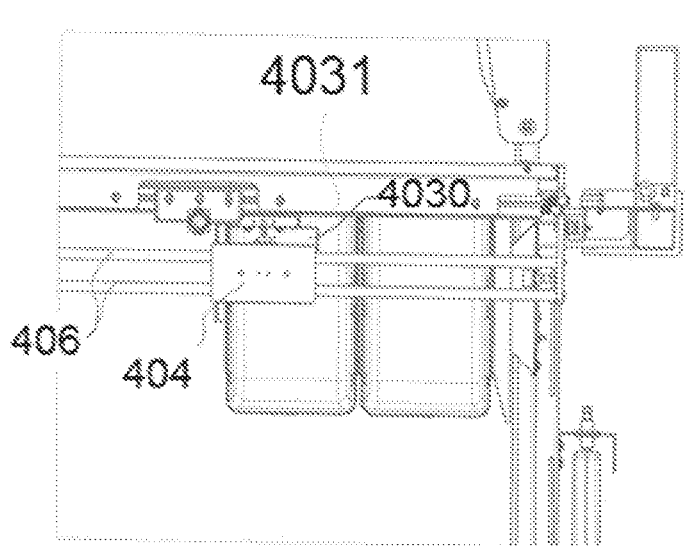
FIG. 6a is a top view of the alignment and/or compaction system and of its details.

For this purpose, as shown in FIGS. 5 and 6, a stopper 400 made of a sheet metal (or alternatively constituted by a plurality of parallel bars) is also arranged above the second conveyor belt 102, the stopper 400 precisely having the function of stopping the containers C in transit on the second belt 102.

The structure carrying the stopper 400 can slide vertically from the "low" blocking position (of the containers C in transit) represented in FIGS. 5 and 6, to a higher position (with respect to the surface 1020 of the second conveyor belt 102) which allows the also transit of containers C of maximum height for which the plant or system 100 has been designed. The "low" blocking position and consequently the highest position can be adjusted according to the need to best adapt the plant depending on the height of the containers C to be processed.

The vertical translation (from bottom to top and vice versa) of the structure of the stopper 400 is obtained through the use of one or more pneumatic cylinders 402, wherein the compacting of the containers C is carried out by a rodless pneumatic cylinder 403 and can be summarized as follows.

Figure 6B:
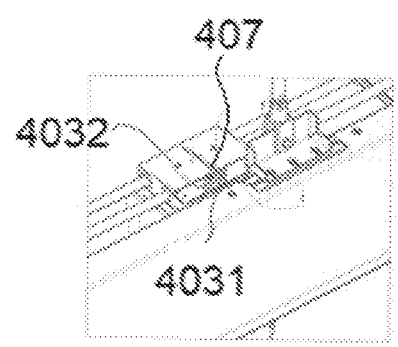
FIG. 6b is a perspective view of the alignment and/or compaction system and of its details.

With the containers C (one or more) abutting the stopper 400, the rodless pneumatic cylinder 403 is activated by a sensor (which detects the presence of one or more containers C abutting the stopper 400) causing an equipment 4030 to translate by pneumatic action along the structure carrying the stopper, the mobile equipment 4030 being equipped with a magnet 4031. During its translational motion transversely to the transport direction T, the equipment 4030 encounters and drags a sled 404 by means of magnetic coupling, the sled 404 being made of aluminum but equipped with a plate in ferrous material 4032; FIG. 6*b* shows the magnet 4031 and the plate 4032 in the condition of mutual magnetic coupling. The slide 404 slides on transversal bars 406 and carries a pusher 405 which can be made in the form of a blade, for example of a metal sheet, or alternatively comprise, as shown, a plurality of steel rods, wherein the steel rods allow to better follow the geometry of the side surfaces of the containers C, so as to avoid jamming and movements that can create a wrong compaction.

The pusher 405 therefore exerts a transverse thrust on the one or more containers C stopped against the stopper 400, in particular on the container positioned more externally (further to the left in the figures with respect to the direction T). In particular, in the case of a single container C stopped against the stopper 400, said single container C is pushed to the right until it occupies the rightmost position; in the case instead of several containers C stopped against the stopper 400, the leftmost container C is pushed against the second to the right of the first), as well as pushing the second against the third (to the right of the second), the third against the fourth (to the right of the third) and so on, thus arranging the containers C according to a transversal row (with respect to the direction of transport T) including a plurality of containers C in mutual contact.

Once the pusher 405 has compacted the containers C as described, the thrust by the pusher 405 overcomes the magnetic resistance between the magnet 4031 and the plate 4032, where the equipment 4030 disengages from the slide 404 and continues until it reaches the end position and no longer transmitting any thrust force to the containers C on the second belt 102, thus avoiding damage or misalignment.

Indeed, the magnetic coupling is dimensioned by suitably choosing the attraction force between the magnet 4031 and the plate 4032 to guarantee the transversal movement of the containers C on the second belt but without creating excessive stresses on the containers C themselves.

A sensor 407 placed on the slide 404 detects the uncoupling between the magnet 4031 and the plate 4032 and reverses the stroke of the rodless cylinder 403, wherein the equipment 4030 is returned to the starting position together with the slide 404 which is magnetically recoupled during the return journey.

Once compacting has taken place, the second conveyor belt 102 is stopped, and the whole structure carrying the stopper 400 is moved vertically, thereby freeing the containers C which are then free to transit towards the dispenser 500.

At this point, the movement of the second conveyor belt 102 resumes (by activation of the relevant drive roller) bringing the containers C into a position suitable for receiving the bedding material.

A sensor (not shown), placed at the end of the belt of the module 201 has the safety function; in fact, if the presence of objects at the exit of the module 201 were to be detected but at the same time the overturning phase was not yet completed or the presence of containers C against the stop bar 103 of the first conveyor belt 101 was detected, the belt of the module 201 would be arrested.

Finally, it should be specified that on the line of the continuous tunnel-shaped washing station it is also possible to process the baskets containing the bottles for watering the animals.

These objects must not and cannot pass from the belt of the washing station (from the relative module 201) to the first conveyor belt 101 but must be discharged directly from the outlet module 201 of the washing line.

Using the operator interface and the PLC that governs these lines, it is possible to program the washing cycle dedicating it to washing bottle baskets, wherein in this case the first conveyor belt 101 automatically sets itself vertically (in the second end position), and wherein the sensor located at the exit of the belt of the washing station is enabled and the operator can get ready to manually unload the bottle baskets from module 201.

It has thus been demonstrated by means of the previous detailed description of the embodiments of the automated system according to the present invention represented in the drawings that the system according to the present invention allows to obtain the desired results and to overcome the drawbacks encountered in the systems according to the prior art, and in particular allows: to process a very wide variety of trays and in any case higher than the variety which can be processed with current solutions; to process different objects, such as for example the lids and the troughs of the relevant cages, in addition to the trays (containers); the transit of the trays and/or other components from the exit of the washing station to the operator's workstation located downstream of the bedding dispensing module without interrupting the workflow; the automatic adaptation to the washing mode of the baskets containing bottles by interrupting the physical continuity of the line immediately after they exit the washing station without mechanical interventions; to use a simple and reliable cage alignment system; and to contain production costs.

Although the automated system according to the present invention has been clarified by means of the previous detailed description of the embodiments represented in the drawings, numerous modifications may be made by the skilled in the art to the embodiments described and represented in the drawings without thereby departing from the scope of protection of the present invention.

The scope of protection of the present invention is thus defined by the claims.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. An automated system for handling containers or component parts, the automated system comprising:
    a first transport means suitable to receive the containers or the component parts; and
    a second transport means arranged in succession to the first transport means, the arrangement defining a transport direction of the containers or the component parts from the first transport means to the second transport means,
    wherein the first transport means define a first transport surface of the containers or component parts and the second transport means define a second transport surface of the containers or component parts,
    wherein the first transport means are switchable between a first position and a second position,
    wherein the first transport means are equipped with first stop means suitable for stopping the containers in a predefined position,
    wherein, with the containers in the predefined position, the switching of the first transport means from the first position to the second position results in the fall of the containers on the second transport surface of the second transport means in an overturned position with respect to the position on the first transport surface of the first transport means,
    wherein the first transport means comprise a first conveyor belt and the second transport means comprise a second conveyor belt, and
    wherein the first conveyor belt is switchable between the first position and the second position by rotation or rototranslation around an axis of rotation, the axis of rotation being fixed or mobile, which is substantially transversal to the transport direction, and
    wherein the axis of rotation of the first conveyor belt is positioned proximate to an end portion of the second conveyor belt adjacent to the first conveyor belt.

2. The automated system according to claim 1, wherein the axis of rotation is fixed and coincides with a second axis of rotation of a first motorized roller which drives the first conveyor belt.

3. The automated system according to claim 1, wherein the first transport surface and the second transport surface are substantially parallel or substantially horizontal.

4. The automated system according to claim 1, wherein the second transport surface is arranged below the first transport surface.

5. The automated system according to claim 1, wherein, in the second position of the first conveyor belt, the first transport surface is rotated with respect to the first position by an angle greater than 90°, and wherein a projection of the first conveyor belt in the transverse direction to the second transport surface of the second conveyor belt at least partially overlaps the second transport surface of the second conveyor belt.

6. The automated system according to claim 1, wherein the first stop means are fastened to the first conveyor belt to be switchable between the first position and second position together with the first conveyor belt.

7. The automated system according to claim 1, wherein the first stop means comprise a stop bar substantially transversal to the transport direction.

8. The automated system according to claim 7, wherein a distance of the stop bar from the transport surface of the first conveyor belt is adjustable according to dimensions of the containers or the component parts.

9. The automated system according to claim 1, wherein the system further comprises:
    a cylindrical brush which is disposed proximate to an end portion of the first conveyor belt opposite the second conveyor belt, and the cylindrical brush can rotate around an axis of rotation substantially perpendicular to the transport direction,
    wherein the rotation of the cylindrical brush is suitable to reposition the containers or component parts on the first transport surface of the first conveyor belt.

10. The automated system according to claim 1, wherein the system further comprises:
    an output module of a station for treating the containers or the component parts,
    wherein the first transport means are suitable to interface the output module so as to receive the containers or the component parts at the output from the output module, and
    wherein the transport direction is substantially parallel to a feed direction of the containers at an outlet from an outlet module.

11. The automated system according to claim 1, wherein the system further comprises:
    a second stop means suitable to translate towards or from the second transport surface of the second conveyor belt respectively to stop or release the containers respectively in or from a predefined position on the second transport surface of the second conveyor belt.

12. The automated system according to claim 11, wherein the system further comprises:
    a thrust means suitable for exerting a thrust on at least one of the containers in the predefined position along a direction perpendicular to the transport direction.

13. A station for dispensing bedding material inside containers comprising:
    a dispenser of the bedding material; and
    an automated system according to claim 1.

14. The station according to claim 13, wherein the dispenser comprises:
    a plurality of nozzles,
    wherein each of the plurality of nozzles is capable of introducing a dose of the bedding material into a respective container of a respective plurality of containers aligned and compacted by compaction and alignment means of the automated system.

\* \* \* \* \*